United States Patent [19]
Fox

[11] Patent Number: 5,113,434
[45] Date of Patent: May 12, 1992

[54] BATTERY BOOSTED DIAL MEMORY

[75] Inventor: Ronald C. S. Fox, Randwick, Australia

[73] Assignee: Alcatel N.V., Amsterdam, Netherlands

[21] Appl. No.: 473,444

[22] Filed: Feb. 1, 1990

[30] Foreign Application Priority Data

Feb. 2, 1989 [AU] Australia .................. PJ2526

[51] Int. Cl.5 ............................ H04M 19/00
[52] U.S. Cl. ......................... 379/413; 379/387; 379/355
[58] Field of Search ............ 379/387, 413, 355

[56] References Cited

U.S. PATENT DOCUMENTS

| | | | |
|---|---|---|---|
| 4,272,650 | 6/1981 | Bolgiano et al. | 379/387 X |
| 4,532,382 | 7/1985 | Pommer, II | 379/413 X |
| 4,647,787 | 3/1987 | Pommer, II | 379/413 |
| 4,653,088 | 3/1987 | Budd et al. | 379/413 X |
| 4,813,072 | 3/1989 | Moses et al. | 379/387 X |
| 4,847,899 | 7/1989 | Hikida | 379/413 |
| 4,961,220 | 10/1990 | Tentler et al. | 379/413 |

Primary Examiner—James L. Dwyer
Assistant Examiner—Magdy Shehata
Attorney, Agent, or Firm—Christie, Parker & Hale

[57] ABSTRACT

A telephone subset has a dial circuit (2) which can be powered from the exchange line (11, 12) via a regulated voltage terminal (VDD) of an associated transmission circuit (3) when the subset is OFF-HOOK and the line voltage is above a threshold voltage. When the subset is ON-HOOK, the dial circuit (2) is powered from a battery (B1) via a first switching circuit (TR2, TR3, R3). A hook-switch (HS) hold the first switching circuit OFF when the subset is OFF-HOOK to isolate the battery (B1) from line voltage. If the line voltage falls below the threshold when OFF-HOOK, a current sensing resistor (R4) switches a second switching circuit to connect the battery (B1) to the dial circuit (2) while the regulated voltage terminal presents a high impendance to isolate the battery from line voltage.

9 Claims, 1 Drawing Sheet

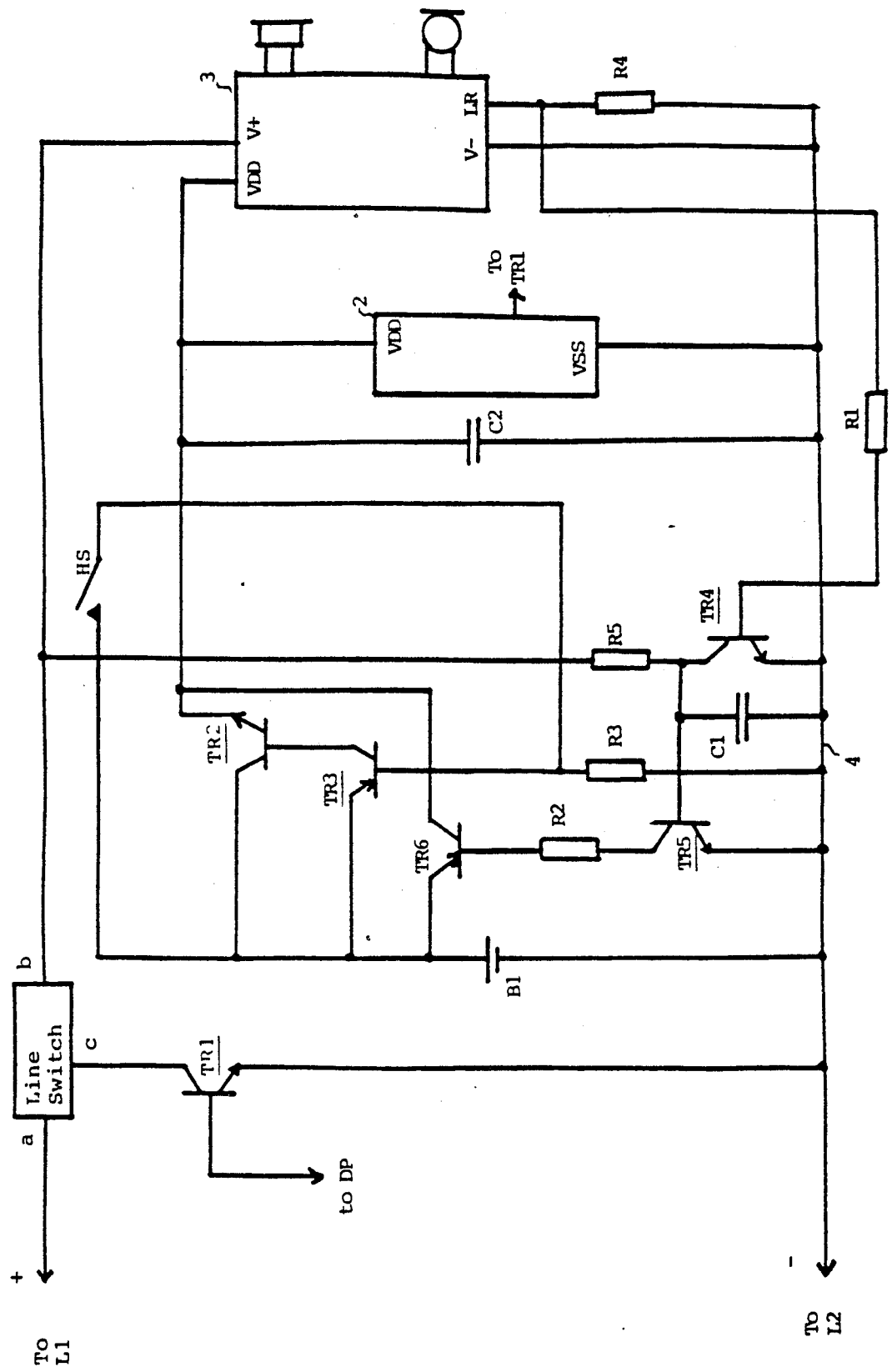

BATTERY BOOSTED DIAL MEMORY

TECHNICAL FIELD

This invention relates to telephone subsets incorporating an integrated circuit for producing dial signals, sometimes called a pulse/tone repertory dialler circuit.

The dialler circuit contains a volatile memory in which to store re-dial numbers and repetory numbers. This type of memory must therefore be maintained by a sufficient source of power both in the ON-HOOK and OFF-HOOK modes.

BACKGROUND OF THE INVENTION

Where low voltage subsets are used the memory of the dialler circuit is conventionally maintained when the subset is in the ON-HOOK mode by an internal battery in the form of a dry cell usually of the lithium type. The battery is disconnected from the dialler circuit's power terminals when the subset is brought into the OFF-HOOK mode, the power terminals then being connected to the exchange battery via the subset's operated hook switch.

It is imperative that the internal battery terminals are electrically isolated from the exchange battery in order to avoid detrimental charging of the internal battery where the exchange battery voltage exceeds the internal battery voltage, and, where the internal battery voltage exceeds the exchange battery voltage, to avoid discharging of the internal battery.

A problem arises when a low voltage subset is connected in a parallel arrangement with one or more other subsets in that, in the event that the low voltage subset is in the OFF-HOOK mode and its dialler circuit's memory is being powered by the exchange battery, and another subset is brought into the OFF-HOOK mode, the voltage at the line terminals of the subsets drops to a level insufficient to maintain the memory in the dialler circuit.

SUMMARY OF THE INVENTION

It is therefore an object of the present invention to provide a circuit arrangement in a low voltage subset which, in the event of the voltage at the line terminals of the OFF-HOOK subset dropping to a level insufficient to maintain the subset's dialler circuit memory, connects an internal battery having sufficient power, and at the same time electrically isolating the internal battery from the exchange battery.

According to the invention there is provided a telephone subset arrangement comprising line terminal means across which is connected, via the switching path of a controllable semiconductor line switch, a loop current circuit of a transmission circuit means, said loop current circuit including a load resistance means; a dialler circuit means including a memory means and power terminal means connected to a regulated voltage source derived from normal line current in said loop current circuit by regulator means; a hook switch means capable of being rendered into an OFF-HOOK state or an ON-HOOK state; wherein said arrangement further comprises a first controllable semiconductor switch means, a control element of which is coupled to a circuit which includes said hook switch means, and a switching path of which couples said battery power supply means to said power terminal means of the dialler circuit means when said hook switch means is in the ON-HOOK state, and decouples said battery power supply means therefrom when the hook switch is in the OFF-HOOK state; and a second controllable semiconductor switch means, a control element of which is coupled across said load resistance means, and a switching path of which couples said battery power supply means to said power terminal means of the dialler circuit means when line current in said loop current circuit falls to a predetermined magnitude, said battery power supply means being decoupled from the line current by said regulator means.

In order that the invention may be readily carried into effect, an embodiment thereof will now be described in relation to a drawing showing a schematic circuit of part of a low voltage subset incorporating the present invention.

BRIEF DESCRIPTION OF THE DRAWING

The FIGURE is a circuit diagram of backup battery power supply that energizes the dialer when a low or no voltage is available across the telephone line.

DESCRIPTION OF THE INVENTION

Referring to the drawing, the circuit comprises a line switch 1 comprising a semiconductor switching arrangement (not shown) whose controllable conductive path is connected between terminals "a" and "b" and whose control element is coupled to terminal "c"; a line switch control switch in the form of an NPN transistor TR1; an internal 3 volt battery B1, preferably of the lithium type; a first battery switching arrangement comprising an NPN transistor TR2 and a PNP transistor TR3, controlled by hook switch HS; a second battery switching arrangement comprising NPN transistors TR4 and TR5, PNP transistor TR6 and associated bias resistors R1, R2 and R3; a dialler circuit 2 which includes a dial pulse output DP, power terminals VDD and VSS; an integrated transmission circuit 3, for example a Motorola MC34014 Telephone Speech Network, including a positive line voltage terminal V+ connected to the subset's line terminal L1 (not shown) via "a"-"b" terminals of line switch 1, a negative line voltage terminal V− connected to the subset's line terminal L2 (not shown) via a common rail 4, a regulated voltage output VDD connected to power terminal VDD of dialler circuit 2. This regulated voltage is the output of a known shunt type regulator (not shown) with a nominal voltage, typically about 3.3 volts. The nominal output current is increased when dialling. The transmission circuit further includes a DC load resistor terminal LR which is connected to the negative line voltage terminal V− by a load resistor R4 which determines the DC resistance of the subset, and removes power dissipation from the transmission circuit.

A capacitor C1 is connected across the emitter/collector of transistor TR4 and an associated filter resistor R5 is connected between the collector of transistor TR4 and the junction of terminal "b" of line switch 1 and the positive line voltage terminal V+.

A capacitor C2 is connected across VDD and the common rail.

In operation, firstly in the case of the low voltage subset being ON-HOOK and no parallel subsets OFF-HOOK: being in the ON-HOOK mode line switch 1 is in a non-conducting state and hence there is no voltage on line voltage terminals V+ and V−. Battery B1 renders transistors TR2 and TR3 conducting thereby connecting the positive pole of battery B1 to terminal VDD of dialler circuit 2. Terminal VSS of dialler circuit 2 is connected to the negative pole of battery B1 via the common rail 4. The dialler circuit's memory is thereby maintained. As line switch 1 is not conducting, exchange battery is isolated from line voltage terminals V+ and V− and consequently isolated from battery B1.

Secondly, in the case of the above subset being brought into the OFF-HOOK mode and no parallel subsets OFF-HOOK: Transistors TR2 and TR3 are rendered non-conducting by a shunt circuit closed by hook switch HS. Transistor TR1 is rendered conducting by a signal on terminal DP of the dialler circuit 2 and thereby renders line switch 2 conducting. As a consequence exchange battery is connected to line voltage terminals V+ and V− causing current to flow through resistor R4 via LR terminal of the transmission circuit. In this case the current is such that a voltage is produced across resistor R4 which is sufficient to turn on transistor TR4 which thereby prevents transistor TR5 and TR6 from turning on. The positive pole of battery B1 is thereby electrically isolated from terminal VDD of dialler circuit 2 and the regulated voltage provided at terminal VDD of transmission circuit 2.

Thirdly, in the case of the subset being in the OFF-HOOK mode and a parallel subset is brought into the OFF-HOOK mode: the line current drops accordingly, typically to less than 8 .ma. The voltage at the positive line voltage terminal V+ falls and when the voltage is below a threshold voltage, typically 1 volt, the VDD terminal of the transmission circuit switches to a high impedance state in a known manner to electrically isolate battery B1 from line voltage terminal V+ and prevent it from discharging. The voltage produced across resistor R4 is not sufficient to turn on transistor TR4 via resistor R1 and consequently transistors TR5 and TR6 are turned on. The positive pole of battery B1 is connected to terminal VDD of dialler circuit 2 via the emitter/collector junction of transistor TR6 maintaining the dialler circuit's memory.

Capacitor C1 prevents TR5 from turning on while dial signals are applied to the subset's line terminals with no parallel subsets OFF-HOOK.

If the subset is not connected to an exchange line, the internal battery cannot discharge because transistor TR6 is not conducting.

While the present invention has been described with regard to many particulars it is understood that equivalents may be readily substituted without departing from the scope of the invention.

I claim:

1. A telephone subset arrangement including
   first and second line terminals to attach the subset to an exchange line;
   a controllable semiconductor line switch coupled between said line terminals;
   a transmission circuit in series with the line switch and also coupled between said line terminals;
   a voltage regulator means also in series with the line switch and also coupled between the line terminals for providing a regulated voltage derived from the exchange line at a regulated voltage output;
   a dialler circuit including a dialler memory connected to the regulated voltage output of the regulator means;
   a battery;
   a first controllable electronic switch coupled between the dial memory and the battery;
   hook switch means for detecting an ON-HOOK state in which the transmission circuit and the voltage regulator means are disconnected from the exchange line by the line switch, for switching the first controllable electronic switch ON when the subset is in said ON-HOOK state, whereby the dial circuit arrangement is powered by the battery when the subset is in said ON-HOOK state and the battery may be isolated from the output of the voltage regulator means when the subset is not in the ON-HOOK state;
   first current sensor means in series with the transmission circuit; and
   a second controllable electronic switch in parallel with the first controllable electronic switch and responsive to the first current sensor means such that the second controllable electronic switch is switched OFF when the current in the transmission circuit is above a predetermined current threshold and ON when said current is below said predetermined current threshold.

2. A subset arrangement as claimed in claim 1 wherein said voltage regulator means monitors the line voltage across the line terminals and presents a high impedance at said regulated voltage output when the line voltage falls below a predetermined voltage threshold, whereby the battery is isolated from the line voltage via said high impedance.

3. A subset arrangement as claimed in claim 2, wherein the voltage regulator means are part of the transmission circuit.

4. A subset arrangement as claimed in claim 2, wherein the first current sensor means comprises a first resistor.

5. A subset arrangement as claimed in claim 2, wherein the first controllable electronic switch comprises a first NPN transistor whose collector/emitter path connects a first terminal of the battery to the dial circuit arrangement and a first PNP transistor whose emitter/collector path connects the first terminal of the battery to the base of the first NPN transistor, wherein a second resistor connects the base of the first PNP transistor to the second terminal of the battery.

6. A subset arrangement as claimed in claim 5, wherein said subset sensor means comprises a mechanical switch which is open when a handset is ON-HOOK and closed when the handset is OFF-HOOK, and wherein the mechanical switch is connected between the base and emitter of the first PNP transistor.

7. A subset arrangement as claimed in claim 6 wherein the second controllable electronic switch comprises a second PNP transistor whose emitter/collector path connects the first terminal of the battery to the dial circuit arrangement, wherein the base of the second PNP transistor is connected via a third resistor in series with the collector/emitter path of a second NPN transistor to the second terminal of the battery, wherein the base of the second NPN transistor is connected to the junction of the series connection of a fourth resistor and the collector/emitter path of a third NPN transistor which series connection is in parallel with the transmission circuit and the first current sensor means, and wherein the base of the third NPN transistor is connected to the first current sensor means.

8. A subset arrangement as claimed in claim 7, further comprising a capacitor connected across the emitter/collector junction of said third NPN transistor.

9. An arrangement as claimed in claim 1, wherein said transmission circuit is an integrated telephone speech network comprising a positive supply voltage pin, a load resistance pin and a negative voltage supply pin, said line current flowing via said positive supply voltage pin, to said negative voltage supply pin and also to said load resistance pin and said first current sensor is connected to said load resistance pin.

* * * * *